United States Patent [19]

Catlin et al.

[11] Patent Number: 5,595,357
[45] Date of Patent: Jan. 21, 1997

[54] AIRCRAFT STALL WARNING SYSTEM

[75] Inventors: Paul A. Catlin, Lowell; Douglas C. Ballard, Wayland; Gary S. Watson, Ada, all of Mich.; Alfred M. Worden, Brecksville, Ohio

[73] Assignee: The B. F. Goodrich Company, Akron, Ohio

[21] Appl. No.: 270,702

[22] Filed: Jul. 5, 1994

[51] Int. Cl.$^6$ .............. B64D 43/00; G08B 23/00
[52] U.S. Cl. .............. 244/1 R; 73/170.02; 340/966
[58] Field of Search ............. 244/1 R; 340/966; 73/170.02

[56] References Cited

U.S. PATENT DOCUMENTS

| | | | |
|---|---|---|---|
| 2,748,372 | 5/1956 | Bunds, Jr. | 340/966 |
| 3,630,169 | 12/1971 | Corey | 244/1 R |
| 3,686,936 | 8/1972 | Daudt, Jr. | 340/966 |
| 3,839,699 | 10/1974 | Heinsohn et al. | 340/966 |
| 4,590,475 | 5/1986 | Brown | 340/966 |
| 4,610,213 | 9/1986 | Walker | 244/203 |
| 4,910,513 | 3/1990 | Kelly et al. | 340/966 |
| 4,936,146 | 6/1990 | Stack et al. | 244/203 |
| 5,341,677 | 8/1994 | Maris | 244/1 R |

*Primary Examiner*—Galen L. Barefoot
*Attorney, Agent, or Firm*—Richard A. Romanchik; William E. Zitelli

[57] ABSTRACT

An aircraft stall warning system includes an angle of attack sensor which provides a signal to an angle of attack processor which provides an angle of attack signal to a display. An air pressure sensor provides an air turbulence intensity ratio signal to an aerodynamic performance processor which provides an aerodynamic performance signal to the display. The display therefore simultaneously displays both theoretical stall margin and actual stall margin to thereby provide a pilot with wing contamination information.

17 Claims, 5 Drawing Sheets

AIRCRAFT STALL WARNING SYSTEM

FIELD OF THE INVENTION

Present invention relates to aircraft aerodynamic performance displays, and more particularly, a display which provides simultaneous presentation of directly versus indirectly measured aerodynamic performance of an aerodynamically lifting surface.

BACKGROUND ART

The aerodynamic performance of aerodynamically lifting surfaces or airfoils, such as wings, is displayed to the pilot of an aircraft for safety reasons. A critical performance parameter of the airfoil surfaces is stall margin.

Stall detection or warning devices are almost universally fitted to aircraft. The role of the stall warning device is to augment, or substitute for, the natural stall symptoms which may vary according to the aircraft configuration, weight, attitude, and the maneuver being performed. Aircraft can rely on stall detection devices which fall into three groups: those actuated by a hinged vane mounted on the leading edge of the wing, sensitive to the position of the stagnation point of the airflow; angle of attack systems (AOA); and airfoil aerodynamic performance monitors (AP).

Wing leading edge devices sense the movement of the stagnation point as it transitions from above the vane to below it, as the stall is approached. These systems have disadvantages which limit their effectiveness. Among these disadvantages are the fact that the vane is prone to interference from gusts and turbulence G loading, only a limited number of vanes can be fitted on an airfoil, and the vanes are prone to icing.

Angle of attack is defined as the angle formed between the wing chord line and the direction of flight. At any specific angle of attack the airflow over some percentage of the wing surface will generate lift as well as some amount of drag. Maximum lift of the airfoil is usually obtained at a relatively high angle. However, if this angle is further increased, by even a small amount, the airflow over the wing becomes disturbed and buffeting may be felt. Stall is defined as the condition which arises when the angle grows so large that the flow is completely disrupted and not enough lift is generated to overcome the weight of the aircraft. This angle of attack, the stall angle, is constant for a particular airfoil (although various airfoil designs stall at differing angles).

The amount of useful lift and drag generated by any airfoil at some specific angle of attack will depend upon the influence of such variables as the airfoil geometry, density altitude, aircraft gross weight, velocity, etc. However, the ratio of lift to drag coefficients at a given angle remains constant. Therefore, the theoretically ideal ratio of lift and draft coefficients for any flight maneuver will always be found at the same angle of attack under all speed or load conditions.

Although angle of attack is a valuable reference measurement for realizing optimum performance during climb, cruise or landing, contamination on the airfoil affects the stall angle such that the theoretical stall angle based on airfoil geometry differs from the actual stall angle. AOA systems are calibrated when the aircraft wings are free of contamination so the stalling point of the aircraft can be linked to the attitude of the fuselage of the aircraft. This method of stall warning is relatively simple and accurate as long as the wing remains free of contamination. When contamination is present, however, the lifting and stall characteristics of an airfoil change, and the aircraft stalls at a lower angle of attack. In this case a conventional stall warning system with a fuselage mounted sensor no longer provides an accurate measure of the actual stall condition of the aircraft.

Aerodynamically monitoring the performance of an aircraft lifting surface provides this missing component in stall warning, which is the ability to measure the premature loss of lift due to contamination (such as insect deposits, snow, slush, or ice) on the lifting surface. Conventional stall warning systems which use a fuselage mounted angle of attack sensor do not measure the actual stalling condition at the wing. The key to determining an early stall due to the presence of contamination is to measure the flow directly at the lifting surface. Local velocity changes in the region above the upper surface of the wing provide a consistent indication of an approaching aerodynamic stall even when contamination is present.

U.S. Pat. No. 4,435,695 entitled "Method Of Predicting The Approaching Stall Of An Aircraft Wing" to John M. Maris discloses a method of predicting the approaching stall of an aircraft wing by utilizing a probe which measures the local steady state and turbulent components of the airflow at a predetermined location on the top surface of the wing. When the ratio of turbulent flow to steady state flow exceeds a threshold a signal is produced which indicates that a stall is imminent. Contamination on the wing is therefore factored into the stall margin determination in order to provide real time stall warning data.

Referring now to FIG. 1, a typical prior art cockpit display 2 indicates a singular stall margin derived from either an AOA sensor or an AP sensor. A needle 4 indicates a value or range from 0 to 1.0, where 1.0 on the scale represents a stall. A pilot determined how much of a margin there was between the current sensor reading and the sensor reading at which the aircraft will stall.

Referring now to FIG. 2, an alternative display 6 for indicating AOA or airfoil aerodynamic performance was a bar graph type presentation.

If the aircraft was equipped with an AOA detection system the pilot could determine the margin between actual AOA and the theoretical stall AOA.

If the aircraft was equipped with an AP detection system the pilot could determine the margin between actual aerodynamic performance and the actual stall.

Efforts to improve stall warning systems have led to continuing developments to improve their reliability, versatility, practicality and efficiency.

DISCLOSURE OF THE INVENTION

An object of the present invention is to provide a stall warning system for an aircraft cockpit which displays simultaneously angle of attack and airfoil aerodynamic performance.

According to the present invention, a stall warning system for an aircraft includes:

an angle of attack (AOA) sensor for providing an AOA signal indicative of the AOA of the aircraft;

at least one airfoil aerodynamic performance (AP) sensor for providing an AP signal indicative of the aerodynamic performance of the airfoil; and, a processor responsive to said AOA and AP signals for providing a differential signal indicative of the differential between said AOA and AP signals.

According further to the present invention, there is provided a display for an aircraft which includes:

first indicator indicative of the angle of attack of the aircraft; and, second indicator indicative of the aerodynamic performance of the airfoil.

According further to the present invention, there is provided a method of monitoring the performance of an aircraft having an airfoil comprising the step of displaying a differential between the angle of attack of the aircraft and the aerodynamic performance of the airfoil.

The present invention provides a stall warning system that displays a contamination differential between actual aerodynamic performance and AOA predicted stall margin. The present invention therefore eases pilot work load, and can be mounted in already existing cockpit instrumentation panels.

These and other objects, features and advantages of the present invention will become apparent in the light of the detailed description of exemplary embodiments thereof, as illustrated by the drawings.

BEST MODE FOR CARRYING OUT THE INVENTION

Figure 3:
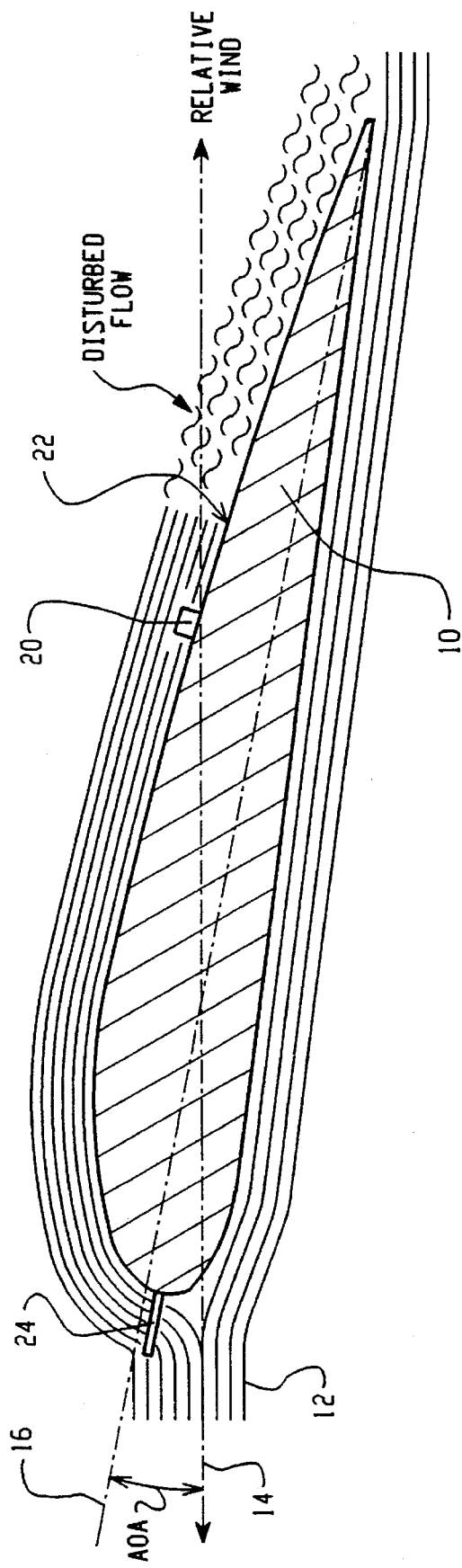
FIG. 3 is a schematic representation of an airfoil and surrounding airflow in accordance with the present invention.

Referring now to FIG. 3, an airfoil 10 for generating lift for an aircraft is thrust through a surrounding airflow 12. The angle of attack (AOA) represents the angle between the direction of flight plane 14 and the airfoil chordline 16.

AOA is measured utilizing a sensor 24 attached either to the fuselage of the aircraft or on the leading edge of the airfoil 10.

The aerodynamic performance (AP) of the airfoil is measured by an airfoil aerodynamic performance monitor utilizing a transducer or sensor 20 located on the top of the airfoil 10. FIG. 3 shows how the airflow above the wing changes from the leading edge to the trailing edge. At the leading edge, there is laminar flow which then transitions to turbulent flow at the trailing edge. A separation point 22 develops on the airfoil and beyond that point separated or reverse flow is present. As the AOA of the airfoil increases toward stall, the separated flow from the trailing edge of the airfoil moves forward. The local air velocity (or airflow) at any point over the airfoil consists of a steady component and a fluctuating component. At a given chordwise location on the airfoil the steady state component of the airflow will change from a positive value to zero and then go negative as the AOA increases through stall.

The key to the AP stall sensitivity at the airfoil is the measurement of a turbulence intensity ratio given by the equation:

$$R = U_{rms}/U_{ss}.$$

The ratio, R is derived by dividing the root mean square of the fluctuating velocity (or turbulent component of the velocity), $U_{rms}$, by the time average velocity (or steady state component of the velocity), $U_{ss}$. This ratio reflects both the subtle changes in the turbulent flow content of the flow as well as the onset of reverse flow from the trailing edge of the wing.

There is a consistent relationship between the turbulence intensity ratio and the actual stall point of the wing whether the wing is free of contamination or not. The value of the ratio that is measured at stall for a clean wing is the same value that is measured for a contaminated wing. The value indicates stall in both cases, but since the indication occurs at a lower angle of attack for the contaminated condition, it is possible to maintain a consistent margin with respect to the actual stall for all conditions of the wing. As the AOA increases, the steady component goes to zero and the R value goes to infinity. This rapid rise in R provides a consistent indication of the onset of stall.

Operation of APs is further described in U.S. Pat. No. 4,435,695, identified earlier. Further teachings of APs can be found in SAE Technical Paper No. 922010 entitled "Stall Warning Using Contamination Detecting Aerodynamics" by Paul A. Catlin, both of which are hereby incorporated herein by reference.

A preferred AP sensor for use in the present invention is Model No. APT-280 available from Jet Electronics and Technologies, Inc.

Preferred AOA sensors for use in the present invention may be either Model 12 or 861 available from Rosemount Aerospace, Inc.

Figure 4:
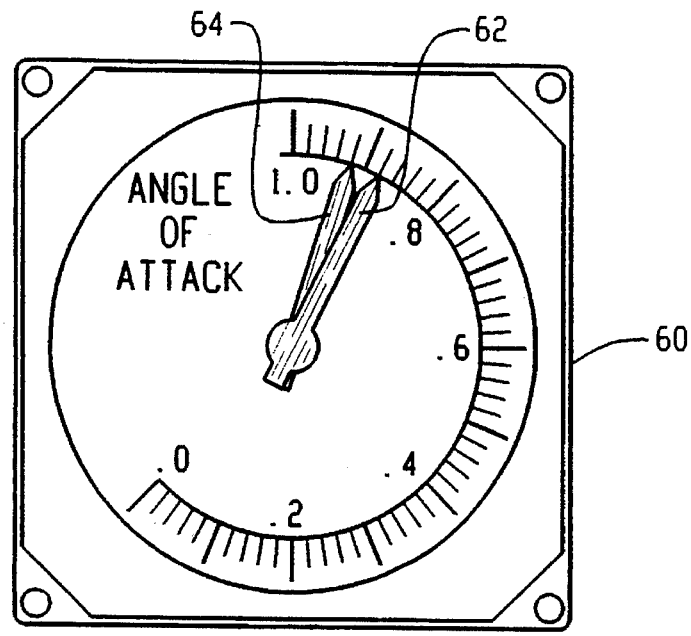
FIG. 4 is a schematic representation of a display for a stall warning system in accordance with the present invention.

Referring now to FIG. 4, a stall warning system display in accordance with the present invention includes a display 60 which displays information derived from both an AOA sensor 24 and an AP sensor 20. The output data from each sensor is displayed simultaneously such that a first needle 62 indicates AOA and a second needle 64 indicates the aerodynamic performance (AP) of the airfoil 10. Display 60 therefore provides a pilot with a visual indication of his present angle of attack and also information on whether the airfoil is contaminated or not by virtue of a differential appearing between the angular position of the two needles 62, 64.

The needles 62, 64 may be mechanically or electrically interlocked using a locking mechanism (see FIG. 7) so that a differential between the two needles appears only under the condition when the AP needle "exceeds" or is closer to a stall value of 1.0 than the AOA needle. That is, the display indicates only the AOA value until such time as the AP signal exceeds the AOA signal, at which point a split, or differential appears between the two needles.

Figure 1:
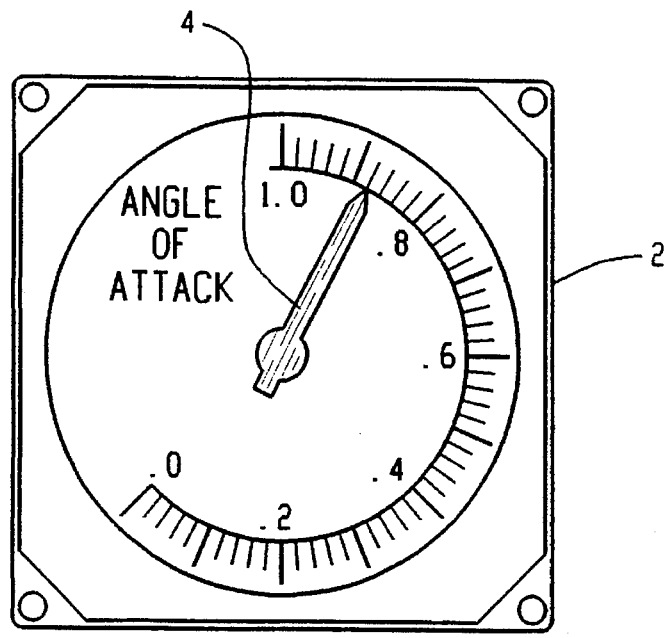
FIG. 1 is a schematic representation of a prior art stall warning display.
Figure 2:
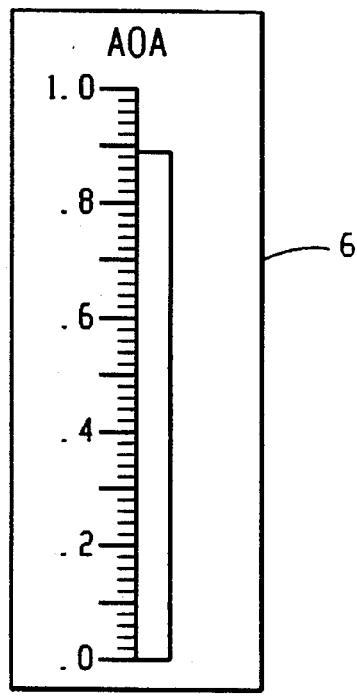
FIG. 2 is a schematic representation of a second embodiment of a prior art stall warning display.

Heretofore, a singular needle or indicator as illustrated in FIGS. 1 and 2 provided strictly stall margin information. A pilot therefore could not determine from looking at his stall warning display whether the wings were contaminated or not.

Additionally, the stall warning system in accordance with the present invention may display the ratio of the difference between the AOA signal and the AP signal divided by the AOA signal, represented by the equation:

(AP-AOA)/AOA.

Figure 5:
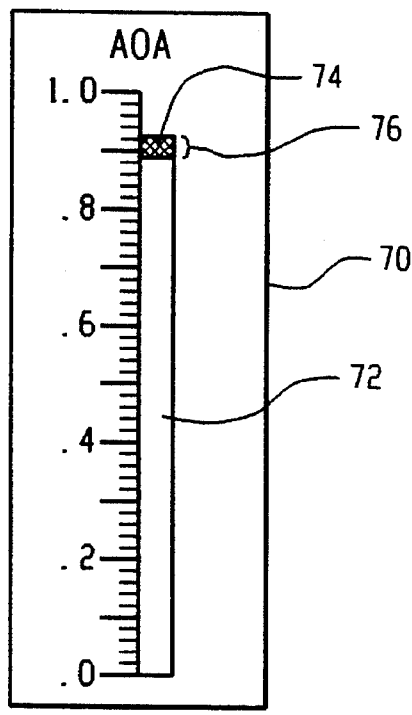
FIG. 5 is a schematic representation of a display for a stall warning system in accordance with a second embodiment of the present invention.

Referring now to FIG. 5, an alternative method of indicating stall margin differential is to provide a display 70 which provides a bar graph type display. The AOA information is displayed in a first bar 72, the AP information is displayed on a second bar 74 and the differential 76 is easily identifiable.

Figure 6:
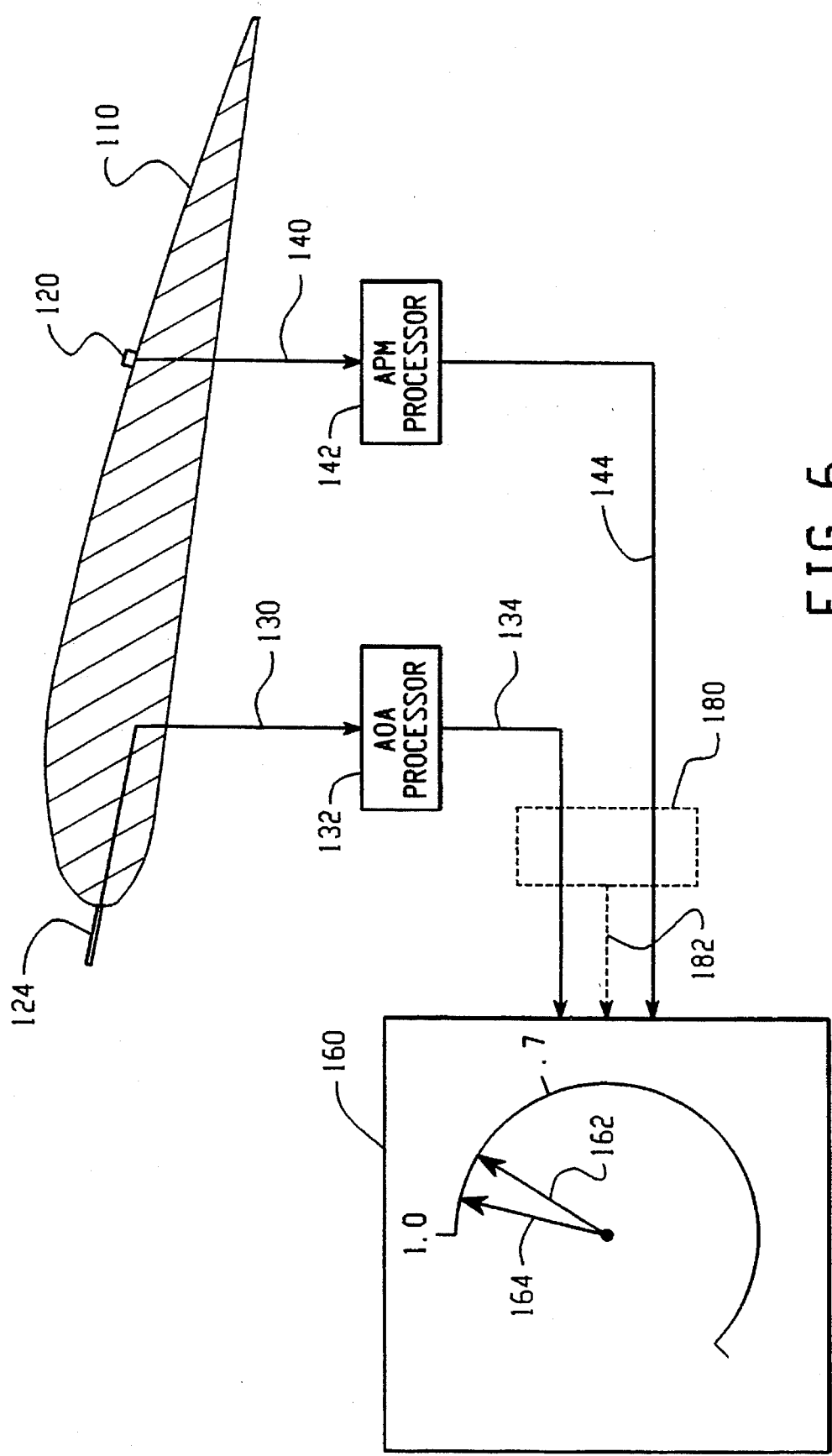
FIG. 6 is a schematic representation of a stall warning system in accordance with the present invention.

Referring now to FIG. 6, wherein a stall warning system in accordance with the present invention generally similar to the stall warning system illustrated hereinbefore in the previous figures and is thus indicated by references numerals corresponding to those discussed above, except that a 100 "prefix" is utilized. An AOA sensor 124 provides a first AOA signal on a line 130 to an AOA processor 132 which conditions the first AOA signal on line 130 and normalizes it to a relative stall margin scale, and provides a conditioned AOA signal on a line 134 connected to a cockpit display 160. Display 160 has two needles 162, 164 for displaying the AOA and AP signal information.

An AP sensor 120 provides an aerodynamic performance signal on a line 140 to an AP processor 142 which conditions the aerodynamic performance signal on line 140 and normalizes it to the same relative stall margin scale as the conditioned AOA signal, and provides an AP signal on a line 144 to display 160. AP sensor 120 is preferably an air pressure sensor, such as Model No. APT-280 available from Jet Electronics and Technologies, Inc. described hereinbefore. AP processor 142 determines both the fluctuating velocity (or turbulent component of the velocity), $U_{rms}$, and the time average velocity (or steady state component of the velocity), and calculates the ratio R of the two as described hereinbefore. The R value is thereafter conditioned and normalized and provided as the AP signal on line 144 for simultaneous display with the AOA signal.

It is to be noted that processors 132, 142 may be manufactured as individual units, or they may be combined into a singular processor unit, as will be described hereinafter.

AOA sensor 124 and AP sensor 120 may be any of a number of equivalent sensors well known to those skilled in the art, such as those described hereinbefore. AOA processor 132 may be any of a number of equivalent processors well known to those skilled in the art, such as Model No. 20 or 30 available from Rosemount Aerospace, Inc. AP processor 142 may be any of a number of equivalent processors well known to those skilled in the art, such as Model No. APC-2000 available from Jet Electronics and Technologies, Inc.

A quick glance at the display 160 therefore indicates a variety of information, including both theoretical stall margin and actual stall margin. If there is a difference between theoretical and actual stall margin, the pilot then has the opportunity to investigate further as to the cause (i.e. wing contamination, etc.) and thereafter take corrective action.

Display 160 receives AOA signal and an AP signal and simultaneously provides a "visual" stall margin signal or indication. If there is a split in the two needles, the display 160 provides a "visual" differential stall margin signal or indication. An additional processor 180 may be utilized to receive the AOA and AP signals and calculate a differential signal and provide the differential signal on a line 182 to a different type of display (not shown) which visually displays the calculated differential signal in some other fashion.

Figure 7:
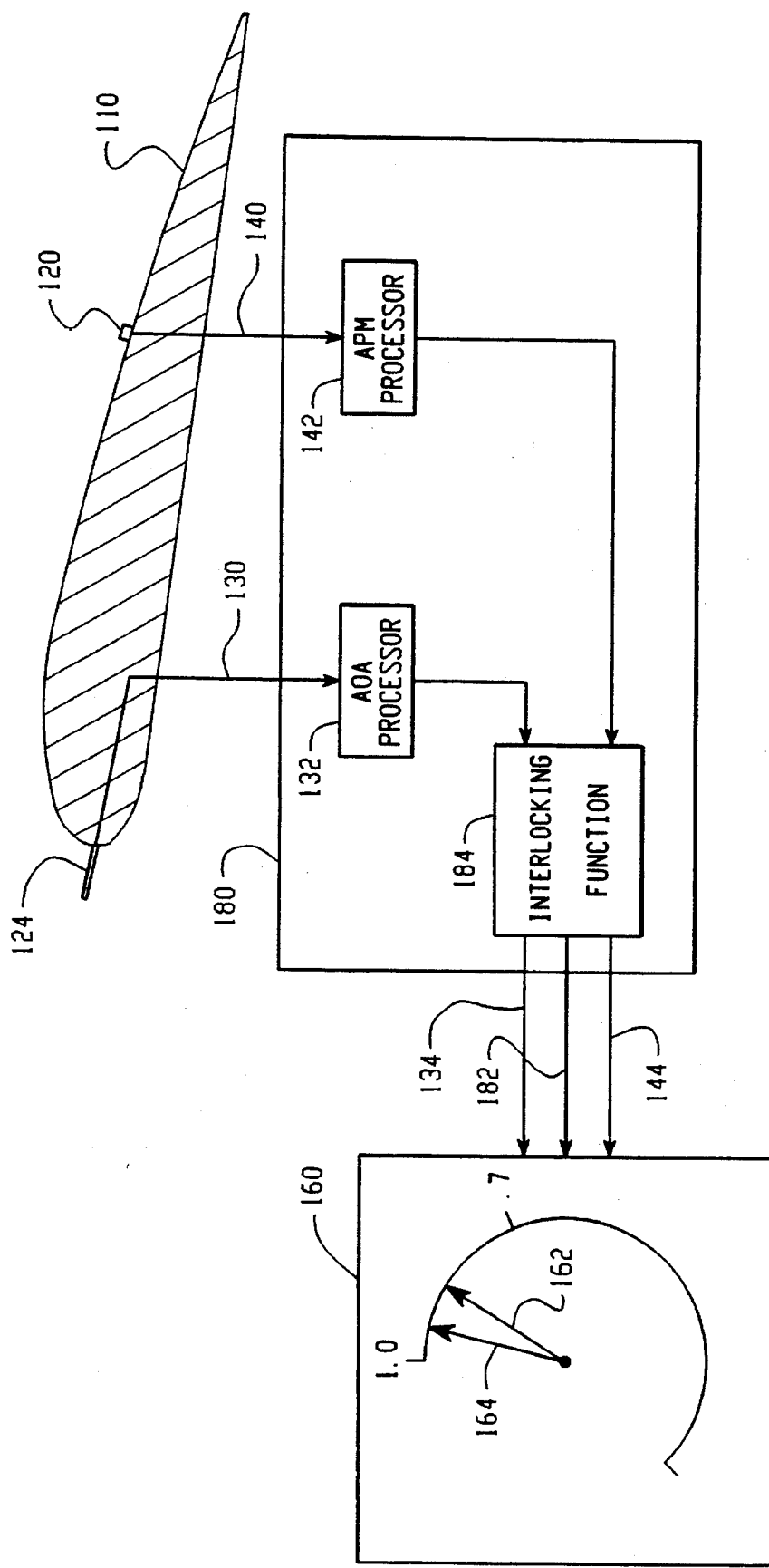
FIG. 7 is a schematic representation of an alternate stall warning system with an interlocking function in accordance with the present invention.

Alternatively, as shown in FIG. 7, processors 132, 142 may be combined into processor 180 as described earlier. In addition to signal conditioning and calculation of the differential signal, processor 180 could be utilized to perform the electrical interlocking function described earlier, and shown at 194 so that the differential signal on line 182 provides a needle split only under the condition when the AP needle 164 "exceeds" or is closer to a stall value of 1.0 than the AOA needle 162. That is, the display indicates only the AOA value until such time as the AP signal exceeds the AOA signal, at which point a split, or differential appears between the two needles.

It is to be noted that the present invention is not to be limited to the AOA and AP sensors defined herein. Other functionally equivalent AOA and AP systems may be utilized to provide angle of attack of the aircraft and aerodynamic performance. For instance, the AP system may utilize one or more parameters in determining the airfoil aerodynamic performance, such as calibrated airspeed, aircraft weight, pitch rate, vertical acceleration, bank angle, center of gravity and angle of slide slip. Those skilled in the art understand that more than one sensor is necessary to measure all of the above mentioned parameters, and therefore multiple AP sensors may be necessary.

It is also to be noted that the present invention can be utilized to indicate conditions other than stall margin, such as lift capability, maximum lift capability, minimum drag performance, and fuel optimization at cruise. The most important aspect of the present invention is the display of a differential between stall margin derived from angle of attack of the aircraft and stall margin derived from aerodynamic performance of the wings.

Although the invention has been shown and described with exemplary embodiments thereof, it should be understood by those skilled in the art that the foregoing and various other changes, omissions and additions may be made therein and thereto without departing from the spirit and scope of the invention.

We claim:

1. A common display for displaying indications of an aerodynamic performance and an angle of attack of an aircraft having an airfoil comprising:

first indicator indicative of the angle of attack of the aircraft;

second indicator indicative of the aerodynamic performance of the airfoil;

said first and second indicators being integrated into said common display for simultaneously displaying the angle of attack and aerodynamic performance indications from the common and an interlocking means for interlocking the first and second indicators to display a differential therebetween only under predetermined conditions.

2. A display for displaying the aerodynamic performance of an aircraft having an airfoil in accordance with claim 1, wherein said second indicator is indicative of a ratio of airflow fluctuations over the airfoil to a steady state airflow of the airfoil.

3. A display for displaying the aerodynamic performance of an aircraft having an airfoil in accordance with claim 1, wherein said first indicator is comprised of an AOA needle, the angular displacement of said AOA needle being a function of the angle of attack of the aircraft and said second indicator is an AP needle, the angular displacement of said AP needle being a function of the aerodynamic performance of the airfoil.

4. A display for displaying the aerodynamic performance of an aircraft having an airfoil in accordance with claim 1, wherein said first indicator is comprised of an AOA bar, the length of said AOA bar being a function of the angle of attack of the aircraft and said second indicator is an AP bar, the length of said AP bar being a function of the aerodynamic performance of the airfoil.

5. A display for displaying the aerodynamic performance of an aircraft having an airfoil in accordance with claim 1, wherein said second indicator is indicative of contamination of the airfoil.

6. The common display in accordance with claim 1 wherein the predetermined conditions includes the aerodynamic performance indication being closer to a stall value than the angle of attack indication.

7. The common display in accordance with claim 1 wherein the predetermined conditions includes the aerodynamic performance indication exceeding the angle of attack indication.

8. The common display in accordance with claim 1 wherein the means for interlocking interlocks the first and second indicators to the first indicator to display solely the angle of attack indication absent the predetermined conditions.

9. A method of monitoring the performance of an aircraft having an airfoil comprising the steps of:

displaying simultaneously from a common display a first indication of the angle of attack of the aircraft and a second indication of the aerodynamic performance of the airfoil; and interlocking said first and second indications to display a differential between the angle of attack of the aircraft and the aerodynamic performance of the airfoil only under predetermined conditions.

10. A method of monitoring the performance of an aircraft having an airfoil in accordance with claim 9, wherein said displaying step is comprised of the steps of:

measuring the angle of attack (AOA) of the aircraft and the aerodynamic performance (AP) of the airfoil; and, simultaneously displaying the angle of attack of the aircraft and the aerodynamic performance of the airfoil on a common display.

11. A method of monitoring the performance of an aircraft having an airfoil in accordance with claim 9, wherein said displaying step is comprised of providing an AOA needle, the angular displacement of said AOA needle being a function of AOA of the aircraft and an AP needle, the angular displacement of said AP needle being a function of AP of the airfoil.

12. A method of monitoring the performance of an aircraft having an airfoil in accordance with claim 9, wherein said displaying step is comprised of providing an AOA bar, the length of said AOA bar being a function of AOA of the aircraft and an AP bar, the length of said AP bar being a function of AP of the airfoil.

13. A method of monitoring the performance of an aircraft having an airfoil in accordance with claim 10, wherein said measuring step is comprised of measuring the amount of contamination of the airfoil.

14. A method of monitoring the performance of an aircraft having an airfoil in accordance with claim 10, wherein said measuring step is comprised of the steps of:

measuring the airflow fluctuations caused by air turbulence over the airfoil; and, calculating a ratio of the airflow fluctuations to a steady state airflow.

15. The method in accordance with claim 9 wherein the predetermined conditions includes the aerodynamic performance display being closer to a stall value than the angle of attack display.

16. The method in accordance with claim 9 wherein the predetermined conditions includes the aerodynamic performance display exceeding the angle of attack display.

17. The method in accordance with claim 9 wherein the step of displaying includes displaying solely the angle of attack absent the predetermined conditions.

* * * * *